(12) United States Patent  (10) Patent No.: US 8,851,504 B1
Goldszer  (45) Date of Patent: Oct. 7, 2014

(54) LIGHT DUTY X-FRAME CART (71) Applicant: JGR Copa, LLC, Hollywood, FL (US)

(72) Inventor: Jacob Goldszer, Hollywood, FL (US)

(73) Assignee: JGR Copa, LLC, Hollywood, FL (US)

( * ) Notice: Subject to any disclaimer, the term of this patent is extended or adjusted under 35 U.S.C. 154(b) by 0 days.

(21) Appl. No.: 14/243,017

(22) Filed: Apr. 2, 2014

Related U.S. Application Data (60) Provisional application No. 61/908,219, filed on Nov. 25, 2013.

(51) Int. Cl.
*B62B 1/00* (2006.01)
*B62B 3/02* (2006.01)

(52) U.S. Cl.
CPC .................................. *B62B 3/02* (2013.01)
USPC ............................................. 280/651

(58) Field of Classification Search
USPC .............. 280/651–652, 639, 40, 645, 47.131, 280/43.1, 47.18, 47.26
See application file for complete search history.

(56) References Cited

U.S. PATENT DOCUMENTS

| | | | |
|---|---|---|---|
| 1,718,962 A | 7/1929 | Kimball | |
| 1,769,418 A * | 7/1930 | Cooper et al. | 280/645 |
| D160,659 S | 10/1950 | Reece | |
| D165,191 S | 11/1951 | Reece | |
| D180,868 S | 8/1957 | Diehl | |
| 3,191,958 A | 6/1965 | Smith | |
| 3,207,526 A * | 9/1965 | Brodeck | 280/652 |
| 3,627,342 A | 12/1971 | Morellet | |
| 3,677,571 A | 7/1972 | Maturo, Jr. et al. | |
| 3,693,993 A | 9/1972 | Mazzarelli et al. | |
| 3,992,038 A * | 11/1976 | Guadano, Sr. | 280/659 |
| 4,044,931 A | 8/1977 | Catelli | |
| 4,055,357 A | 10/1977 | Sorocin | |
| 4,222,585 A | 9/1980 | Crothers | |
| 4,248,453 A | 2/1981 | Stark | |
| 4,266,807 A | 5/1981 | Griffin | |
| 4,355,818 A | 10/1982 | Watts | |
| 4,362,307 A | 12/1982 | Nakatani | |
| 4,429,897 A | 2/1984 | Friedman et al. | |
| 5,988,671 A * | 11/1999 | Abelbeck et al. | 280/649 |
| 6,354,619 B1 * | 3/2002 | Kim | 280/651 |
| 6,598,898 B2 * | 7/2003 | Chu | 280/652 |
| 8,162,349 B1 * | 4/2012 | Roselle | 280/654 |
| 8,608,188 B2 | 12/2013 | Goldszer | |

* cited by examiner

*Primary Examiner* — John Walters
*Assistant Examiner* — James Triggs
(74) *Attorney, Agent, or Firm* — Robert C. Kain, Jr.

(57) ABSTRACT

The X-frame cart has pivotally connected X-frame legs with front and rear wheels at terminal leg ends, a lower rear cross frame member between the wheels, and a lower framework with fore-aft-left-right frame members to define a rectangular openwork space. The lower framework is pivotally mounted to opposing X-frame members at the lower rear cross frame member. A flexible panel spans a portion of the rectangular openwork space. The panel is mounted on either the lower fore and aft frame members or on the left and right longitudinal frame members which define the rectangular or square openwork space. A pull bar pivotally mounted to the front end lower framework and the rear wheel permits the pull bar to move the cart fore-end towards the rear-end when the pull-bar is moved upward. The X-frame legs collapse towards each other. The cart has a chair hanger and an open-top bag.

27 Claims, 5 Drawing Sheets

LIGHT DUTY X-FRAME CART

This is a regular patent based upon and claiming the benefit of provisional patent application Ser. No. 61/908,219 filed Nov. 25, 2013, the contents of which is incorporated herein by reference thereto.

The present invention relates to an X-frame cart with foldable frame members that can be used to carry items such as light-duty chairs (such as beach chairs), towels, blankets, food stuffs and other related items.

BACKGROUND OF THE INVENTION

Certain types of carts are known which collapse into a compact shape such that the cart can be stowed in the trunk of an automobile and carried reasonable distances and, with some ease, opened up such that the wheeled cart can carry beach towels, chairs, a cooler, blankets and other items commonly used by persons.

Examples of collapsible carts are disclosed in: U.S. Pat. Nos. 6,598,898; 8,608,188; 5,915,722; 5,988,671; 3,191,958; 3,627,342; 3,677,571; 3,693,993; 4,055,357; 4,222,585; 4,266,807; 4,429,897; 4,703,944; 4,790,559; 4,865,346; 4,887,837; and 5,197,754. Other carts are disclosed in U.S. Pat. No. 5,915,722 to Thrasher and U.S. Pat. No. 5,988,671 to Abelback wherein the beach cart is collapsible but the lower frame of these beach carts are hinged to the forward legs and the rear legs.

OBJECTS OF THE INVENTION

It is an object of the present invention to provide a lightweight cart with foldable or collapsible X-frame members that can easily be folded into a compact structure and stowed in a trunk of a car and, in another mode, unfolded such that the X-frame can hold items such as light duty chairs, beach chairs, towels, blankets, coolers and other flat-bottomed carriers.

It is a further object of the present invention to provide an X-frame cart with a flexible panel disposed between the forward and rearward wheel sets thereby permitting the user to place flat-bottomed items, such as coolers, etc. on the flexible panel for transport in the lower sectional region of the light duty cart.

It is another object of the present invention to provide an X-frame cart with a chair carrier at the upper front or forward end of the cart. The chair carrier can hold stacked light duty chairs, such as beach chairs, on the cart.

SUMMARY OF THE INVENTION

The foldable light duty X-frame cart carries items such as light duty chairs, towels, blankets and food stuffs and includes an X-frame structure consisting of opposing rigid side X-frame members. Each X-frame member (left and right frame members) includes a first elongated X-frame leg (extending from an upper handle cart region to a lower forward wheel cart region) and a second elongated X-frame leg (extending from a lower rear wheel cart region to an upper forward-facing cart region). The first X-frame legs are pivotally joined to the second X-frame legs at their mid-sections. The X-frame has forward wheels at the terminal ends of the first legs and rearward wheels at the terminal end of the second legs.

The rearward wheels rotate with respect to a lower rear cross frame member which forms one cross support structure for the X-frame cart. The cart includes a lower framework formed by a fore-frame, an aft-frame, and left and right longitudinal frame members which define a substantially rectangular openwork space. The term "substantially rectangular" is meant to cover a square or rectangular space. The lower framework is pivotally mounted to opposing X-frame members at the lower rear cross frame member. A flexible panel spans a portion of the rectangular openwork space. The panel is mounted on either the fore and aft frame members or on the left and right longitudinal frame members which define the rectangular or square openwork space.

At least one and preferably two pull bars are deployed between the lower framework and the front wheel end region of the cart. The pull bar is pivotally mounted at a forward end of the cart (near the forward wheels) and either at the rearward end of the lower longitudinal framework or at a longitudinal midsection of the lower longitudinal framework. With this construction, when the front end of the lower framework is pulled upward, the pull bar moves the forward wheel end of the cart towards the rear end of the cart. Concurrently, the first and second X-frame legs move towards each other about the pivot point because the pull bar moves the front wheels and the lower end of the first X-frame leg towards the rear wheels. The cart has a handle bar at the upper cart region joining opposing first X-frame legs and an upper cross bar member joining opposing second X-frame legs at the upper forward-end of the cart.

The cart may include a forward extending chair hanger (a U-shaped bar), pivotally mounted to (a) the upper ends of the second X-frame legs (a preferred embodiment) or (b) the upper forward cross member. A supplemental upper fore-end cross member is connected adjacent the terminal ends of the U-shaped hanger frame element. A bag element, which carries parcels, has an open end defined by fore, aft and opposing side edges. The bag sides fall away from the bag edges. The bag is connected, via its fore edge, to the upper fore-end cross member and, via its aft edge, to either the upper ends of the first X-frame legs or a supplemental upper rear cross bar. The bag depth is substantially equivalent to a cart space height. The left and right side edges of the bag define a tension line lock which limits longitudinal outboard movement of the rear and fore upper ends of the cart.

The cart has an off center swing hinge lock between the chair hanger and the upper ends of the second X-frame legs. The cart has a latch lock bar between the first and second X-frame legs, spaced apart from the leg pivot.

DESCRIPTION OF DRAWINGS

Further objects and advantages of the present invention can be found in the detailed description of the preferred embodiments, when taken in conjunction with the accompanying drawings in which.

DETAILED DESCRIPTION OF THE PREFERRED EMBODIMENTS

The present invention relates to an X-frame cart with collapsible or foldable frame members that can be used to carry items such as light-duty chairs (such as beach chairs), towels, blankets, food stuffs and other related items.

The frames and framework elements can be bars or tubes or rods having various different cross-sectional shapes (round, square, rectangular, oval) and sizes, different than those shown in the drawings. It should also be mentioned that in one of the preferred embodiments, the frame sections are fabricated from tubular steel or other metallic composites. However, the fame sections may be made from any suitable material such as plastic or the like. The bag may be net, cloth, plastic, transparent or opaque.

Figure 1:
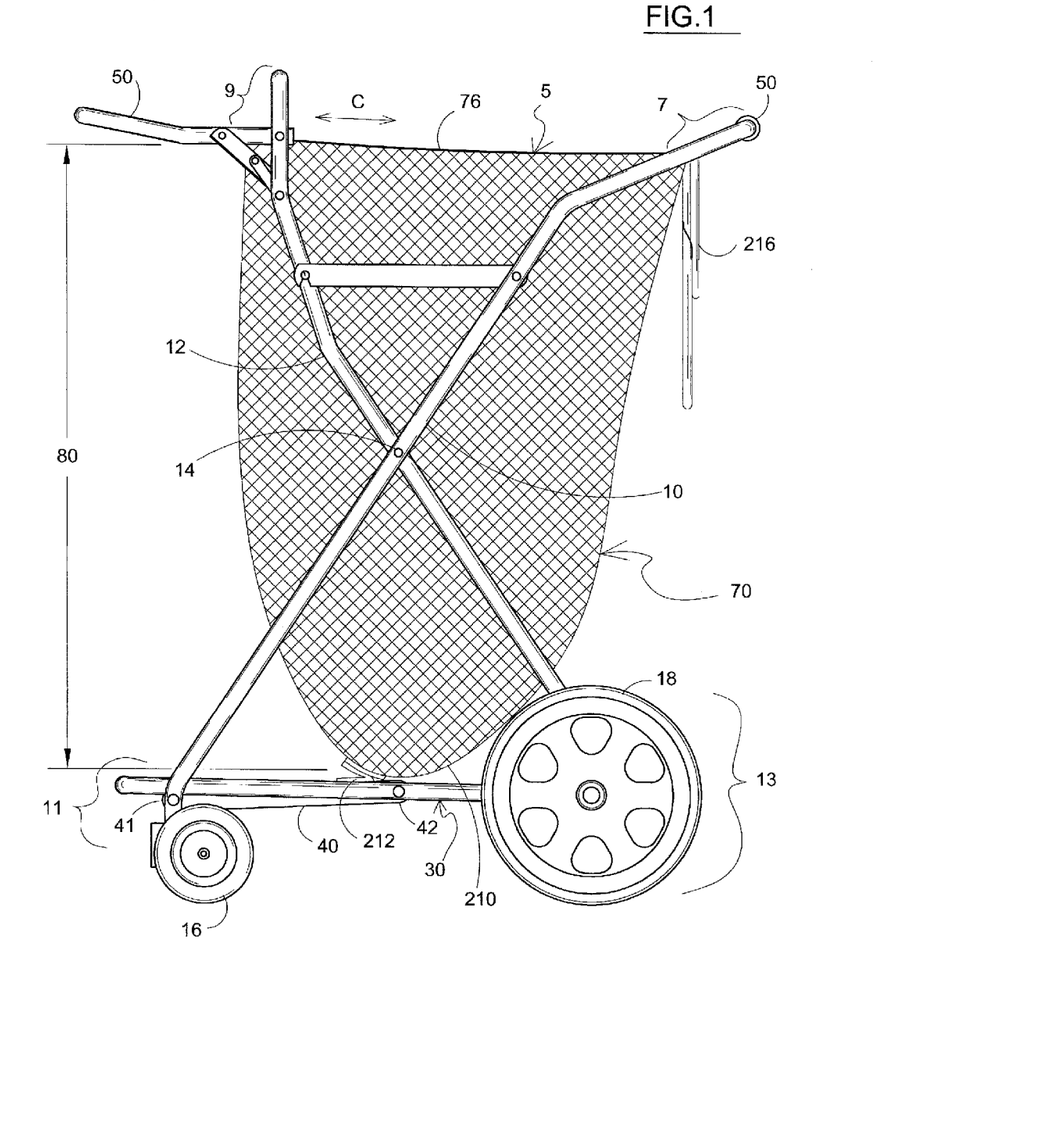
FIG. 1 diagrammatically illustrates a side elevational view of the light duty X-frame cart (herein sometimes referred to as "XF cart")

FIG. 1 diagrammatically illustrates a side, elevational view of the X-frame cart ("XF cart"). Cart 5 includes a first elongated X-frame leg 10 and a second elongated X-frame leg 12. XF frame leg 10 extends from an upper handle cart region 7 to a lower forward wheel cart region 11. Second X-frame leg 12 extends from a lower rear wheel cart region 13 to an upper forward-facing cart region 9.

A chair carrier 50, sometimes called herein a chair hanger, is pivotally attached in the upper forward facing cart region 9 and, more precisely in the illustrated embodiment, to opposing second XF legs 12. A bag 70 is adopted to carry parcels, food stuffs, towels, beach blankets etc. and has a depth 80 extending from upper cart region 9 to lower cart region 11. This is cart space with a height 80. In one embodiment, a lower section 210 of bag 70 is removably attached via hook and loop system (such as VELCRO™ 212 attached to a flexible panel 38. The flexible panel is shown better in FIG. 2. A supplemental bag or pouch 216 is attached to the upper handle cart region 7.

Figure 2:
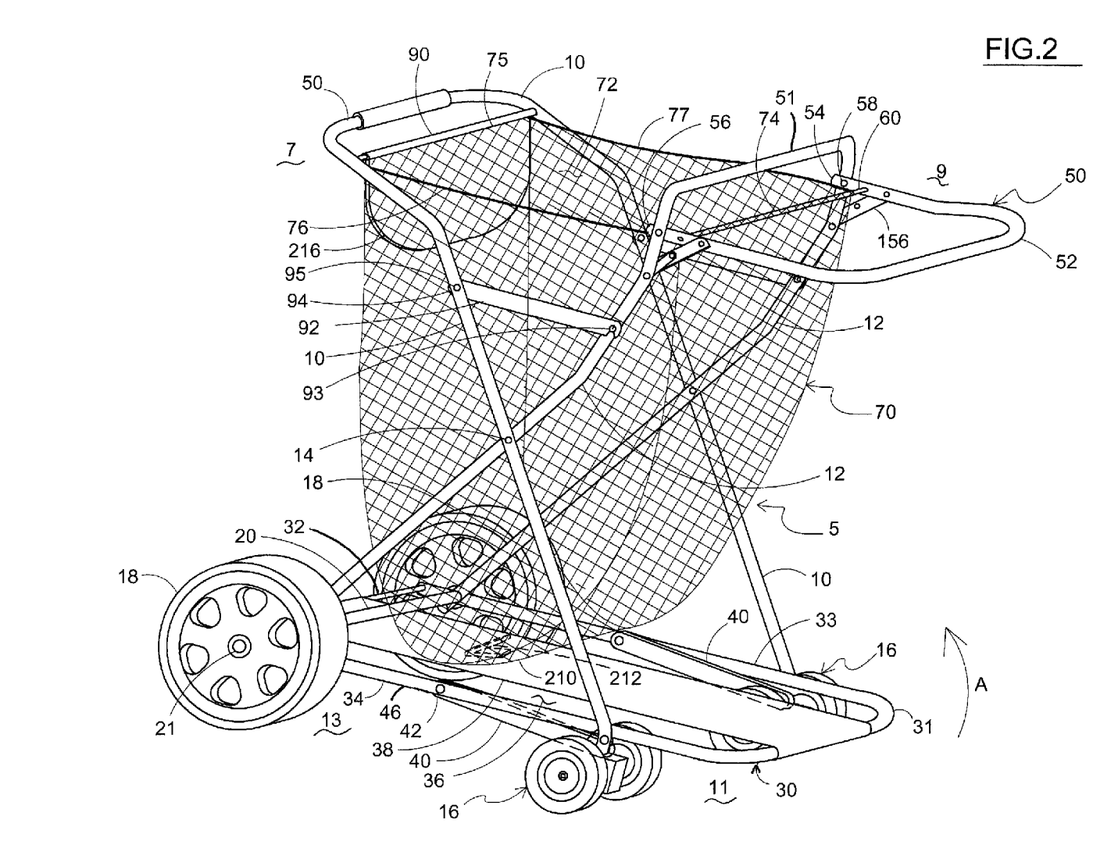
FIG. 2 diagrammatically illustrates a perspective view of the XF cart.
Figure 3:
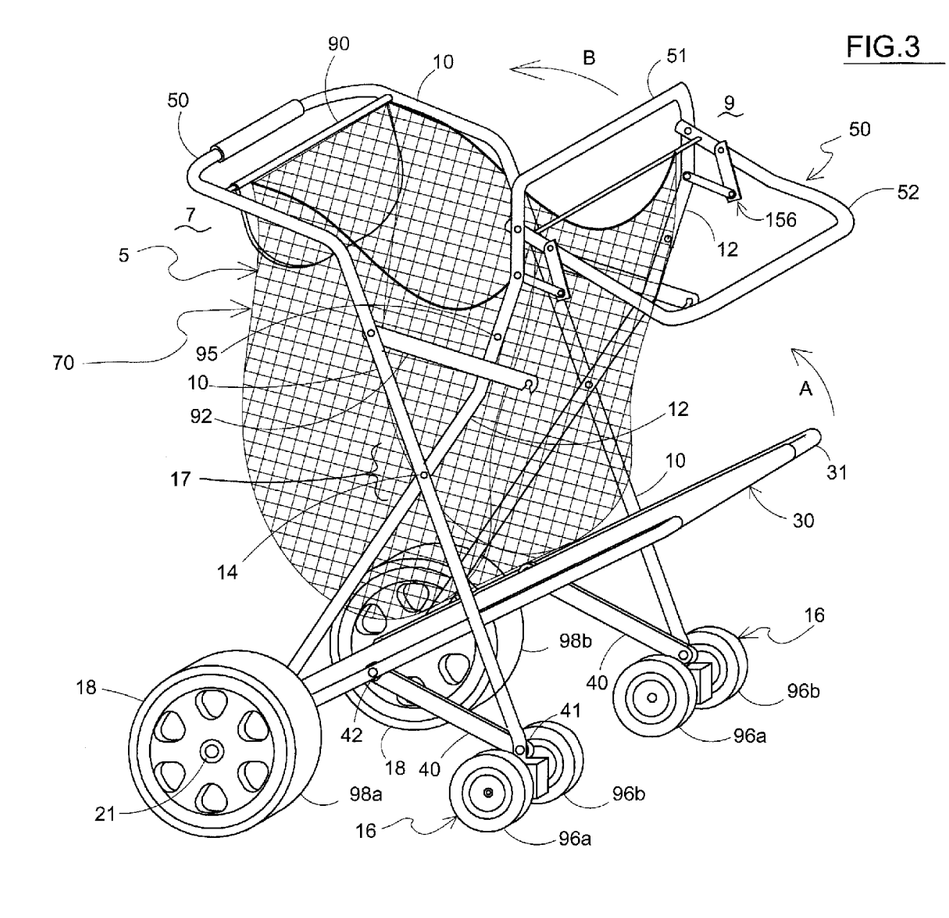
FIG. 3 diagrammatically illustrates the XF cart partially collapsed.

FIG. 2 is a perspective view of light duty cart 5 in a fully deployed open and operational mode. FIG. 3 is a perspective view of light duty cart 5 in a partially collapsed mode. The cart can fold up such that XF legs 10, 12 are nearly adjacent each other. FIGS. 1, 2 and 3 are discussed concurrently herein.

The foldable light duty X-frame cart 5 has a pair of opposing X-frame members, one of which is the first X-frame leg 10 and the other of which is second elongated X-frame leg 12. First X-frame leg 10 extends from handle region 7 to the forward wheel region 11. Second X-frame leg 12 extends from the upper forward facing cart region 9 to the lower rear wheel region 13. Legs 10, 12 are generally elongated, however, leg 12 may have a slight dog leg which enhances the storage and collapsing nature of the cart for transport. The left side X-frame legs 10, 12 are pivotally connected at pivot 14. The right side X-frame legs 10, 12 are pivotally mounted together at pivot point. The pivot 14 is generally in a substantially mid-length region 17 (FIG. 3) of legs 10, 12. When the latches are undone (latch bar 92), the X-frame members can collapse as partly shown in FIG. 3 such that the X-frame legs 10, 12 lay proximate or nearly adjacent each other for transport and storage. Panel 38 is moved into the openwork of XF legs 12.

First X-frame legs 10 have, mounted at their lower terminal ends, a forward wheel system 16. These wheels are rotatably mounted near the bottom portion of X-frame legs 10. Second X-frame legs 12 have a rearward wheel system 18 rotatably mounted near the bottom of legs 12.

Figure 4:
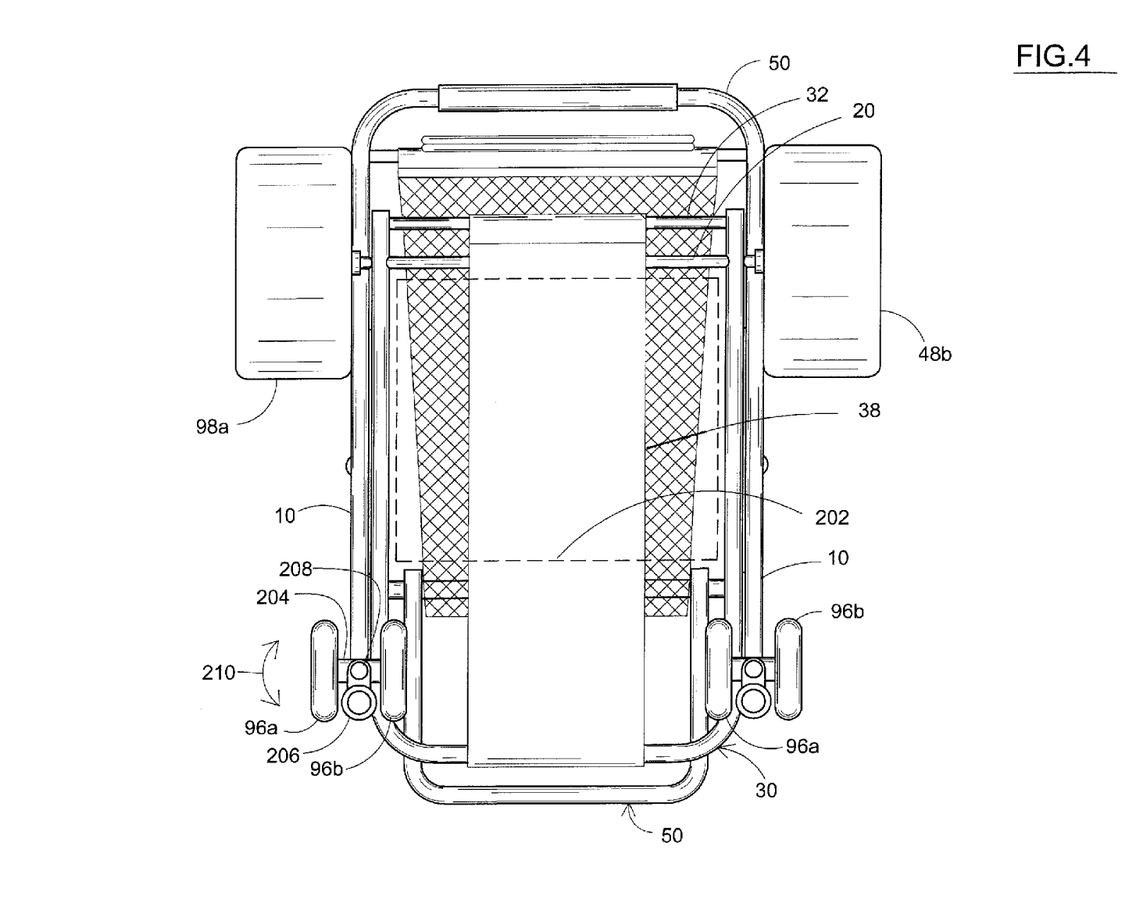
FIG. 4 diagrammatically illustrates a bottom view of the X-frame cart.

The light duty cart 5 includes a rearward lower cross frame member 20 which is disposed about an axis of rotation 21 of the rearward cart wheels 18. In FIG. 4, rear wheel systems 18 include left and right rear wheels 98a and 98b.

Cart 5 includes a lower framework 30 which is an open framework system defining a substantially rectangular openwork space 36. The term "substantially rectangular" includes a square openwork. Openwork space 36 is defined by lower forward frame 31, aft frame 32, left longitudinal frame work member 33 and right longitudinal frame work member 34. The lower framework 30 is pivotally mounted on lower rear cross member 20. In one embodiment, member 20 is on wheel axis 21. Other rear positions may be provided for the pivot of lower frame 30. The fore end of framework 30 is free standing. Movement contrary to directional arrow A in FIG. 2 is prohibited by a stop surface on wheel mount 204 (FIG. 4). A flexible panel 38 stands a substantial portion of the substantially rectangular openwork space 36. In one embodiment shown in FIG. 2, the flexible panel is mounted on the lower fore end frame member 31 and on the lower aft frame member 32. FIG. 4 shows an alternate embodiment (in dashed lines) wherein the flexible panel 38 is shown as a laterally extending panel 202 which spans left longitudinal framework member 33 and right longitudinal framework member 34. This alternate embodiment is shown in dashed lines as panel 202 in FIG. 4.

The flexible panel may be cloth, plastic or other flexible item. A flexible item is beneficial in order to reduce weight for the light duty cart as well as increase the collapsibility and transportability of the cart. A plate element may also be deployed.

Cart 5 includes at least one pull bar 40 having a forward end 41 (FIG. 3) and a rearward end 42. The forward end 41 of pull bar 40 is pivotally mounted at a forward lower end of a cart in region 11. The forward end of pull bar 40 can be attached the forward wheel systems 16 or a bottom portion of XF leg 10. The rearward end 42 of pull bar 40 is pivotally mounted near a longitudinal mid-section 46 of one of the longitudinal frame work members 33, 34. In a preferred embodiment, two pull bars are utilized in order to balance the pulling force in direction A to close and collapse cart 5. Alternatively, the rearward end 42 of pull bar 40 may be mounted to the lower frame 30 closer to the rear of the cart.

At the top of the cart, a handle bar 50 is disposed at the upper handle cart region 7 joining XF legs 10. Handle 50 joins opposing X-frame legs 10 at upper region 7. In one embodiment, opposing legs 10 and handle 50 form a single unitary, integral tube structure. At the forward end, an upper cross bar member 51 joins opposing second X-frame legs 12 at the upper forward facing cart region 9. This structure of XF leg 12 and bar 51 may also be unitary. As shown in FIG. 3, cart 5 collapses into a compact form when the forward section of the lower frame 30 (forehand member 31) is pulled upward and away from front wheel system 16 such that the pull bar 40 draws in the forward wheel system 16 and moves wheel system 16 towards rear wheel system 18. Further, because legs 10 and 12 comprise an X-frame which is pivotal about point 14, the upper forward facing cart region 9 is moved closer to upper handle region 7 when the XF legs pivot about point 14.

A bag 70 is hung on the cart as described later. In one embodiment, bag 70 has a lower section 210 which has a releasable attachment mechanism 212 (in one embodiment a hook and loop system (VELCRO™), or alternatively, a button or snap). When the attachment-release system 212 is released, a user, when the cart is fully opened is shown in FIG. 2, can place flat bottom items on flexible panel 38. The bag 70 can be moved upward to accommodate a cooler, other chairs, small skim board or any other flat bottom items placed on flexible panel 38. Additionally, parcels may be placed in the bag as described later. The bag may take any shape, round, square, rectangular and be made of cloth, netting or plastic.

At the upper forward end 9 of cart 5, a forward extending chair hanger 50 is disposed. The chair hanger has an open framework hanger 52 which is pivotally mounted at left and right points 58 to the upper ends of opposing X-frame legs 12. Alternatively, a supplemental upper fore end cross member 60 may rotatively hold chair hanger openwork 52. In one embodiment, the chair hanger 52 is U-shaped with terminal ends 54, 56 pivotally coupled to the upper ends of frame legs 12. Also in one embodiment, the upper fore end cross member 60 is mounted to and near the terminal ends of the U-shaped chair hanger frame work 52. In this manner, when the chair hanger 52 is fully deployed in an open and locked forward facing manner, the cross member 60 places the bag edges in tensions.

Bag element 70 has an open end 72 and its edges are further defined by fore side edge 74, aft edge 75, and opposing longitudinal side edges 76, 77. The fore edge 74 of bag 70 is coupled to the upper fore end cross member 76. Other connection points on the XF legs 12 may be used. The aft edge 75 of bag 70 is coupled to either the opposing X-frame legs 10 or a supplemental, upper rear cross member 90. In a preferred embodiment, aft edge 75 of bag 70 is connected to the supplemental cross member 90.

In the fully deployed state shown in FIG. 2, the opposing bag side edges 76, 77 define a tension line lock which limits longitudinal outboard movement in direction C (FIG. 1) of the upper rear cart portion 7 and the upper forward cart portion 9. This tension line lock occurs because the edge of the bag has a bead which prohibits further outboard movement or movement of forward section 9 away from handle section 7 of the cart. The bag edges 74, 76 are in tension in the fully open cart position of FIG. 2.

The chair hanger 50 has a off center swing hinge lock 156 which is described in detail later in connection with FIGS. 5A-5C. In order to further limit the expansion of X-frame legs 10, 12, the system also includes a latch bar 92. Latch bar 92 has one end 94 (rear end) which is pivotally mounted to leg 10. The forward end 93 of latch bar 92 has a slot with a wide mouth and a narrow throat (see FIG. 3) leading to a generally circular pin region. The latch bar 92 is moved or rotated until pin 95 is placed in the mouth of the slot and then passes through the narrower throat to a wider pin capture region. In other words, when the slot at end 93 of latch lock bar 92 is moved such that pin 95 is in the throat and pin capture region of latch lock bar 92, leg 10 does not move forward or aft compared with leg 12. In FIG. 3, latch lock bar 92 has been disconnected from pin 95 thereby permitting leg 10 to move closer to leg 12 in a collapsible operation. It should be noted that pivot point for latch lock 92 may be on leg 12 and the latch pin 95 could be placed on leg 10.

FIG. 3 shows that the forward wheel system 16 includes a two wheel set 96a, 96b. Each two wheel set is rotatably mounted to the terminal ends of X-frame leg 10. In contrast, the rear wheel set 18 includes only a single wheel 98a, 98b attached to opposing X-frame legs 12.

FIG. 4 diagrammatically illustrates a bottom view of the X-frame cart. Particularly, forward wheel set 16, in one embodiment, includes a wheel coupler 206 which is mounted to the terminal end of X-frame legs 10. The wheel system includes a pivot point 208 permitting the wheel set 96a, 96b to rotate in direction 210. Further, wheels 96a, 96b are rotatably connected to the coupler 206 and the wheels rotate with respect to axial unit 204.

FIG. 4 also shows that rear wheel sets 98a, 98b are rotatably mounted to the frame members. An axial cross member 20 supports the bottom of the cart. An axle may pass through member 20.

Figures 5A, 5B, 5C:
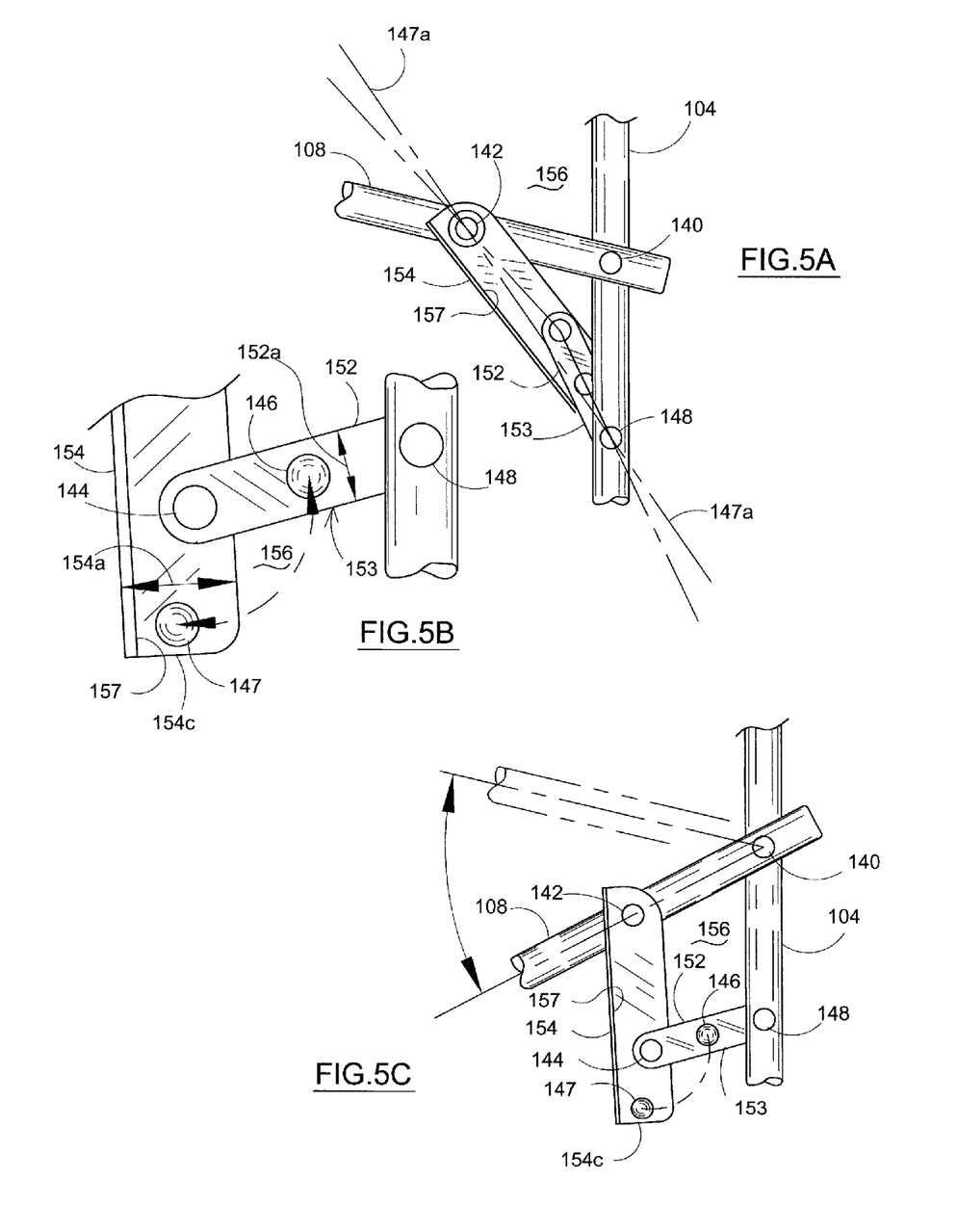
FIG. 5A diagrammatically illustrates a side view of the off center swing hinge lock system for the upper framework in a partly collapsed position.
FIG. 5B diagrammatically illustrates a side view of the off center swing hinge lock system when the first and second hinge arms are fully extended in an off-center locked position.
FIG. 5C diagrammatically illustrates a side view of the off center swing hinge lock system in a partly collapsed position highlighting the detents on the hinge. This view is enlarged to highlight the detents.

FIG. 5A diagrammatically illustrates a side view of off center swing hinge lock system 156 for upper framework of the cart and chair hanger system. The hinge lock system 156 prohibits unintentional closure or collapse of the chair hanger framework from the fully extended position. The hinge lock system 156 includes two hinge arms, each having a planar elongated shape. The first hinge arm 154 and the second hinge arm 152 are rotatably coupled to each other at arm pivot point 144. The position of arm pivot point 144 is generally near the terminal ends of the arms 154, 152.

The hinge lock system 156 is located between the chair hanger segment 108 (the leg of U-shaped hanger 52) and the main-frame structure 104 (leg 10, FIG. 2). More specifically, the hinge lock system 156 is located between one of the main-frame side members 104 leg (10) and an adjacent chair framework 108 hanger (52). As shown in FIG. 5A, in one embodiment, two hinge lock systems 156 operate on opposing frame members 108 (52). The first hinge arm 154 in FIGS. 5A, 5B and 5C is pivotally or hingedly attached to the side of the upper framework side element 108 by pivotal fastener 142. FIG. 5B shows arm 154 on the outside of side element 108 and arm 152 on the inside of main-frame side member 104. The second hinge arm 152 pivotally attaches near the top of main-frame side member 104 on the inside of the side member 104. The term "inside" refers to a position generally inboard the rectangular main-frame members in the cart space 92 (FIG. 2). "Outside" refers to items outside of the bag cart space.

The hinge lock system 156 has a locked position or fully extended off-center position (see FIG. 5B) and an unlocked collapsed position (see FIG. 5A). In the locked position (FIG. 5B), the arm pivot point 144 for arms 152, 154 is closer to the main frame pivotal attachment 140 than when the hinge lock system 156 is in an unlocked position (FIG. 5A). In the locked position, the arms 152, 154 are extended generally linearly with respect to each other and further are over-extended beyond the longitudinal centerline of each arm. See deviated dashed lines which are off set from line 147a. Line 147a passes through frame rail pivot points 142, 148. When the hinge lock system 154 is in its unlocked and collapsed position (see FIG. 5A), the arms 152, 154 are collapsed and are generally adjacent to each other. Arms 152, 154 may lay atop each other when fully collapsed. When arm 154 and arm 152 are fully extended and in the locked position (FIG. 5B), the arm pivot point 144 is inboard with respect to an imaginary line 147a through the pivotal coupling 142 and pivotal coupling 148. Couplings 142, 148 are at opposite ends of each arm 154, 152 away from arm pivot point 144. The term "inboard" means nearer or closer to the main-frame than another point of reference.

Arm 154 includes a stop 157 protruding or extending from the outboard surface of the arm that coacts or abuts edge 153 of the second hinge arm 152. The stop 157 of the first hinge arm 154 can have various embodiments. In one embodiment, the stop 157 is an outboard protruding or extending lip, normal to the plane of the arm, on an edge of arm 154. The stop 157 can also be a pin extending outboard from the plane of arm 154, distal to side frame coupling 140. Lip stop 157 protrudes perpendicularly from the plane of arm 154 toward arm 152. The protruding lip stop 157 on arm 154 abuts or stops the edge 153 on arm 152 such that when the hinge lock system 156 is fully extended (more properly over-extended), the lip stop 157 stops the edge 153 of the arm 152 and stops further inboard movement of pivot point 144 towards pivot coupling 140. In one embodiment, the protruding lip 157 is greater than the width or thickness of arm 152. In another embodiment, the extension of the lip stop 157 is less than the thickness of the edge 153 so long as lip stop 157 can stop the edge 153 of arm 152 from passing therebeyond. In another embodiment, the lip-stop can be a pin or ball or rivet. It is sufficient that arm 152 is stopped by a structure on arm 154 at the off-center position of FIG. 5B.

The arm pivot point 144 of arms 152, 154 (FIGS. 5A, 5B) may be at various positions on the arms as long as pivot point 144 is located away from or distal to the end 154c of arm 154 (FIG. 5C). The edge 153 of the second swing arm 152 abuts the lip stop 157 in FIG. 5B.

In one embodiment, the arm pivot point 144 is inboard or is positioned towards frame pivot 140 such that line 147a is not aligned the longitudinal centerlines of hinge arms 154, 152. See dashed centerlines through arms 154, 152.

As mentioned earlier, the hinge arms 152, 154 have an elongated planar shape. In one embodiment, the first hinge arm 154 is longer in length than the second hinge arm 152. In another embodiment, the second hinge arm 154 is the same or has a longer length than the first hinge arm 152.

The hinge lock system 156 may include a pair of complementary detents. In FIG. 5C, the pair of detents is shown as a first detent 147 on the first swing arm 154 and a complementary second detent 153 on the second hinge arm 152. The first swing arm detent 147 is located near one end (distally located from pivot coupling 142) of arm 154 below arm pivot point 144. The detent shapes should be complementary (a bump matches a depression). The second swing arm detent 46 is located on arm 152 between the arm pivot point 144 and the pivotal coupling or fastener 148. The detents should be aligned atop each other when the hinge lock system 156 is locked off-center (FIG. 2B) and pivot point 144 is inboard towards frame pivot 140.

The complementary detents may have different, but complementary shapes and sizes. In one embodiment, the detent 147 of arm 154 extends or protrudes outward from the plane of arm 154 towards arm 152. The detent 146 of arm 152 is a complementary depression on or in arm 152. In another embodiment, the detents 146, 147 are oppositely configured such that detent 147 is a depression or hole and detent 46 is a protrusion. In both embodiments, when the hinge lock system 156 is fully extended off-center, the first detent 147 fits into the complementary second detent 146 causing arms 152, 154 to lock and further prevent the upper framework from moving or collapsing when forces with respect to the main-frame xx plane act upon it. Therefore, a double lock system is provided on the upper chair frames and legs 10 with off-center lock 156 and detents 146, 147.

The claims appended hereto are meant to cover modifications and changes within the scope and spirit of the present invention.

What is claimed is:

1. A foldable light duty X-frame cart adopted to carry items such as light duty chairs, towels, blankets and food stuffs comprising:
   an X-frame structure including opposing rigid side X-frame members, each x-frame member having a first elongated X-frame leg extending from an upper handle cart region to a lower forward wheel cart region and a second elongated X-frame leg extending from a lower rear wheel cart region to an upper forward-facing cart region, the first X-frame leg pivotally joined to the second X-frame leg at respective substantially mid-length regions of each X-frame leg;
   each first X-frame leg having a forward wheel system rotatably mounted near bottom portions of said first X-frame leg such that opposing first X-frame legs have forward cart wheels rotatably mounted thereon;
   each second X-frame leg having a rearward wheel system rotatably mounted near bottom portions of said second X-frame leg such that opposing second X-frame legs have rearward cart wheels rotatably mounted thereon;
   a lower rear cross frame member disposed about an axis of rotation of said rearward cart wheels;
   a lower framework defined by fore-frame, an aft-frame, and left and right longitudinal framework members which define a substantially rectangular openwork space, the lower framework pivotally mounted to said opposing X-frame members at said lower rear cross frame member;
   a flexible panel spanning a substantial portion of said substantially rectangular openwork space and mounted on said lower fore-frame and said lower aft-frame members;
   at least one pull bar having a forward end and a rearward end, the forward end of said pull bar pivotally mounted at a forward end of said cart at one of said forward wheel systems or at the bottom portion of said first X-frame leg, the rearward end of said pull bar pivotally mounted substantially near a longitudinal midsection of one said lower longitudinal framework members or near the rear of the lower framework member;
   a handle bar disposed at the upper handle cart region and joining opposing first X-frame legs thereat;
   an upper cross bar member joining opposing second X-frame legs at the upper forward-facing cart region;
   said cart collapsing into a compact form when the lower fore-frame member is moved upward such that it pivots about said lower rear cross frame member causing said pull bar to move said forward cart wheels towards said rearward cart wheels and further causing the first X-frame legs to pivot about its mid-region with respect to the second X-frame legs thereby collapsing said first and second X-frame legs towards each other.

2. A foldable light duty X-frame cart as claimed in claim 1 including a forward extending chair hanger, said chair hanger having an open framework hanger pivotally mounted to one of the upper ends of said opposing second X-frame legs, or to said upper cross member.

3. A foldable light duty X-frame cart as claimed in claim 2 wherein the chair hanger open framework includes a U-shaped frame element with terminal ends pivotally coupled to the upper ends of said opposing second X-frame legs.

4. A foldable light duty X-frame cart as claimed in claim 3 including a supplemental upper fore-end cross member which is connected adjacent said terminal ends of the U-shaped hanger frame element.

5. A foldable light duty X-frame cart as claimed in claim 1 including a bag element adapted to carry parcels therein, said bag element having an open end defined by fore, aft and opposing side edges, the fore edge of the bag coupled to said upper fore-end cross member and the aft edge of the bag coupled to opposing X-frame legs in said upper handle cart region.

6. A foldable light duty X-frame cart as claimed in claim 5 wherein said bag has a bag depth substantially equivalent to a cart space height defined by said flexible panel on said lower framework and said upper fore-end cross member.

7. A foldable light duty X-frame cart as claimed in claim 5 wherein the opposing bag side edges each define a tension line lock which limits longitudinal outboard movement of said upper fore-end cross member and the upper regions of said opposing first X-frame legs at said upper handle cart region.

8. A foldable light duty X-frame cart as claimed in claim 4 including a bag element adapted to carry parcels therein, said bag element having an open end defined by fore, aft and opposing side edges, the fore edge of the bag coupled to said upper fore-end cross member.

9. A foldable light duty X-frame cart as claimed in claim 8 wherein said bag has a bag depth substantially equivalent to a cart space height defined by said flexible panel on said lower framework and said upper fore-end cross member.

10. A foldable light duty X-frame cart as claimed in claim 9 wherein the opposing bag side edges each define a tension line lock which limits longitudinal outboard movement of said upper fore end cross member and the upper regions of said opposing first X-frame legs at said upper handle cart region.

11. A foldable light duty X-frame cart as claimed in claim 1 wherein said upper cross bar member is a forward upper cross bar member and the cart including a rearward upper cross bar member adjacent to said handle bar, said rearward upper cross bar member coupled to opposing X-frame legs in said upper handle cart region.

12. A foldable light duty X-frame cart as claimed in claim 11 including a bag element adapted to carry parcels therein, said bag element having an open end defined by fore, aft and opposing side edges, the fore edge of the bag coupled to said upper fore-end cross member and the aft edge of the bag mounted on said rearward upper cross bar member.

13. A foldable light duty X-frame cart as claimed in claim 12 wherein said bag has a bag depth substantially equivalent to a cart space height defined by said flexible panel on said lower framework and said upper fore-end cross member.

14. A foldable light duty X-frame cart as claimed in claim 13 wherein the opposing bag side edges each define a tension line lock which limits longitudinal outboard movement of said upper fore-end cross member and the upper regions of said opposing first X-frame legs at said upper handle cart region.

15. A foldable light duty X-frame cart as claimed in claim 3 including at least one of an off center swing hinge lock between said chair hanger U-shaped frame element and said upper ends of said opposing second X-frame legs.

16. A foldable light duty X-frame cart as claimed in claim 15 including a latch lock bar between said first X-frame leg and said second X-frame leg, said latch lock bar spaced apart from the pivot between said first and second X-frame legs.

17. A foldable light duty X-frame cart as claimed in claim 14 wherein said forward wheel system at the end of said first X-frame legs includes, at the lower terminal end of each said respective first X-frame leg, a pair of wheels rotatably coupled to the first X-frame lower terminal leg end.

18. A foldable light duty X-frame cart as claimed in claim 1 wherein said rearward wheel system at the end of said second X-frame legs includes, at the lower terminal end of each said respective second X-frame leg, a single wheel rotatably coupled to the second X-frame lower terminal leg end.

19. A foldable light duty X-frame cart adopted to carry items such as light duty chairs, towels, blankets and food stuffs comprising:
an X-frame structure including opposing rigid side X-frame members, each x-frame member having a first elongated X-frame leg extending from an upper handle cart region to a lower forward wheel cart region and a second elongated X-frame leg extending from a lower rear wheel cart region to an upper forward-facing cart region, the first X-frame leg pivotally joined to the second X-frame leg at respective substantially mid-length regions of each X-frame leg;
each first X-frame leg having a forward wheel system rotatably mounted near bottom portions of said first X-frame leg such that opposing first X-frame legs have forward cart wheels rotatably mounted thereon;
each second X-frame leg having a rearward wheel system rotatably mounted near bottom portions of said second x-frame leg such that opposing second X-frame legs have rearward cart wheels rotatably mounted thereon;
a lower rear cross frame member disposed about an axis of rotation of said rearward cart wheels;
a lower framework defined by fore-frame, an aft-frame, and left and right longitudinal framework members which define a substantially rectangular openwork space, the lower framework pivotally mounted to said opposing X-frame members at said lower rear cross frame member;
a flexible panel mounted in said substantially rectangular openwork space by attachment to said lower framework;
at least one pull bar having a forward end and a rearward end, the forward end of said pull bar pivotally mounted at a forward end of said cart at one of said forward wheel systems or at the bottom portion of said first X-frame leg, the rearward end of said pull bar pivotally mounted substantially near a longitudinal midsection of one said lower longitudinal framework members or near the rear of the one lower framework members;
a handle bar disposed at the upper handle cart region and joining opposing first X-frame legs thereat;
an upper cross bar member joining opposing second X-frame legs at the upper forward-facing cart region;
said cart collapsing into a compact form when the lower fore-frame member is moved upward such that it pivots about said lower rear cross frame member causing said pull bar to move said forward cart wheels towards said rearward cart wheels and further causing the first X-frame legs to pivot about its mid-region with respect to the second X-frame legs thereby collapsing said first and second X-frame legs towards each other.

20. A foldable light duty X-frame cart as claimed in claim 17 wherein said flexible panel is attached to said left and right longitudinal framework members.

21. A foldable light duty X-frame cart as claimed in claim 19 including a forward extending chair hanger, said chair hanger having an open U-shaped framework hanger pivotally mounted to the upper ends of said opposing second X-frame legs.

22. A foldable light duty X-frame cart as claimed in claim 21 including a supplemental upper fore-end cross member which is connected adjacent the terminal ends of the U0-shaped hanger frame element, said terminal ends of said U-shaped hanger element being pivotally mounted to opposing second X-frame legs; the cart including a bag element adapted to carry parcels therein, said bag element having an open end defined by fore, aft and opposing side edges, the fore edge of the bag coupled to said upper fore-end cross member and the aft edge of the bag coupled to opposing X-frame legs in said upper handle cart region.

23. A foldable light duty X-frame cart as claimed in claim 22 wherein said bag has a bag depth substantially equivalent to a cart space height defined by said flexible panel on said lower framework and said upper fore-end cross member.

24. A foldable light duty X-frame cart as claimed in claim 23 wherein the opposing bag side edges each define a tension line lock which limits longitudinal outboard movement of said upper fore-end cross member and the upper regions of said opposing first X-frame legs at said upper handle cart region.

25. A foldable light duty X-frame cart as claimed in claim 24 including a rearward upper cross bar member adjacent to said handle bar, said rearward upper cross bar member coupled to opposing X-frame legs in said upper handle cart region, and wherein said the fore edge of the bag is coupled to said upper fore-end cross member and the aft edge of the bag is mounted on said rearward upper cross bar member.

26. A foldable light duty X-frame cart as claimed in claim 25 including at least one of an off center swing hinge lock between said chair hanger U-shaped frame element and said upper ends of said opposing second X-frame legs.

27. A foldable light duty X-frame cart as claimed in claim 26 including a latch lock bar between said first X-frame leg and said second X-frame leg, said latch lock bar spaced apart from the pivot between said first and second X-frame legs.

\* \* \* \* \*